Patented Nov. 19, 1929

1,736,429

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PHENYL METHYLENE BIS DIETHYL DITHIOCARBAMATE AND PROCESS OF MAKING THE SAME

No Drawing.    Application filed November 15, 1928.  Serial No. 319,734.

This invention relates to a new chemical substance phenyl methylene bis diethyl dithiocarbamate, and to a method of making it.

This compound may be prepared in the following manner:

36.5 grams of diethyl amine are dissolved in 500 ccs. of alcohol (95%). To this solution 38 grams of carbon disulphide are added with cooling, to prevent loss of materials. Thereupon are added with further cooling for the same purpose 20 grams of sodium hydroxide dissolved in 50 ccs. of water, to form a solution of sodium diethyl dithiocarbamate. 40.25 grams of benzal chloride are then added and the mixture heated at the boiling point of the dilute alcohol under reflux condenser for about two hours when the reaction is completed. On cooling, the product phenyl methylene bis diethyl dithiocarbamate, crystallizes from the alcohol, and on filtering from the alcohol and washing with water to remove the sodium chloride the benzal bis diethyl dithiocarbamate is secured and may be further purified by recrystallization from alcohol. The product is a white crystalline solid melting at 111° C. (corrected). It is insoluble in water, slightly soluble in cold alcohol and soluble in hot alcohol. The name phenylmethylene bis diethyl dithiocarbamate is preferred instead of benzal bis diethyl dithiocarbamate, but it is understood that the compound is the same with either name. The formula of this compound is believed to be

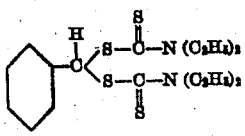

This product may be used for the acceleration of the vulcanization of rubber.

The same procedure may be employed in making other dialkyl derivatives.

Having thus described my invention, what I claim and desire to protect by Letters Patent is:

1. As a new compound phenyl methylene bis diethyl dithiocarbamate corresponding to the formula

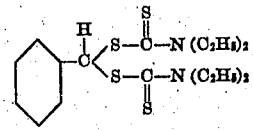

2. The method of making phenyl methylene bis diethyl dithiocarbamate which comprises treating a solution of a diethyl dithiocarbamate salt with benzal chloride, heating until the reaction is completed and separating the phenyl methylene bis diethyl dithiocarbamate from the reaction mixture.

3. The method of making phenyl methylene bis diethyl dithiocarbamate which comprises treating a solution of a diethyl dithiocarbamate salt with benzal chloride, heating until the reaction is completed and separating and purifying the reaction product, phenyl methylene bis diethyl dithiocarbamate.

Signed at Passaic, county of Passaic, State of New Jersey, this 2nd day of November, 1928.

SIDNEY M. CADWELL.